Patented Apr. 6, 1954

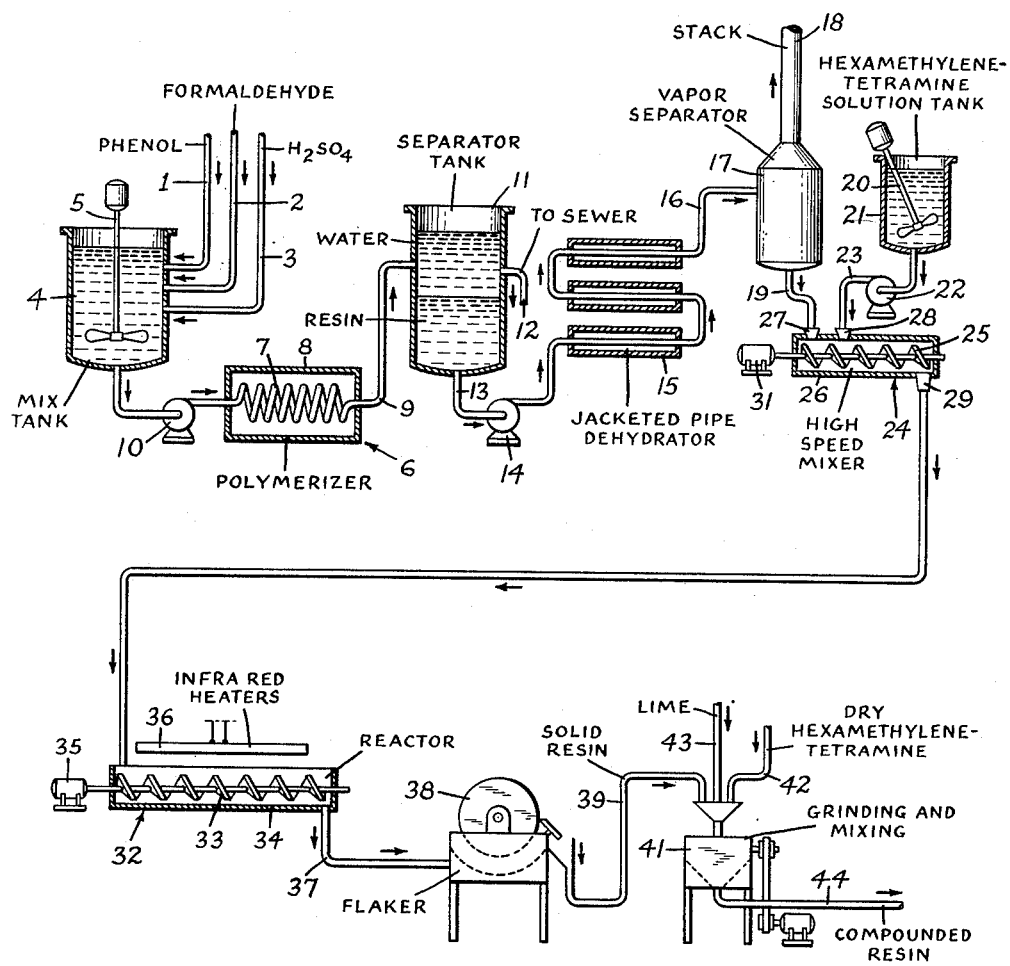

2,674,589

UNITED STATES PATENT OFFICE 2,674,589

LOW FLOW, SHORT CURE PHENOLIC RESIN BINDER

Gordon A. Coleman, Philadelphia, Pa., and Leslie T. Sutherland, Yonkers, N. Y., assignors to Allied Chemical & Dye Corporation, New York, N. Y., a corporation of New York Application February 25, 1952, Serial No. 273,238

6 Claims. (Cl. 260—57)

This invention relates to the manufacture of phenoplasts and more particularly refers to a new and improved method of producing a short cure phenolic resin having low flow properties adapted for use as a binder.

Vast quantities of felted blankets composed of textile or glass fibers bound together with resin binder are manufactured and used. The textile fibers are bonded to yield mainly heat-insulating, sound-deadening blankets used in automobile manufacture. The glass fibers are bonded to produce heat-insulating blankets for refrigerator and tank car manufacture. The felted blankets are ordinarily made by spreading a thin layer of resin onto a pad of fibers and then heating for a period of 60 seconds or less thereby binding the fibers together and producing a blanket having firmness and resiliency. From experience, the properties, specifically cure time (time required to convert the resin to an infusible resin) and flow (relative fluidity at 125° C. of heat-reactive resins), of the resin binder have been found critical in the economical manufacture of satisfactory blankets. The cure time of the resin should be 63±33 seconds at 150° C., preferably 45±15 seconds; flow should be 28±10 mm. at 125° C., preferably 23±5 mm. If during the short cure time the flow of the resin is too low then inadequate binding of the fibers will occur. On the other hand, a resin having too high a flow will tend to penetrate the fibers making them less resilient and satisfactory as an insulating medium. Also the resin penetrating the fibers constitutes waste and greatly increases the cost of the blanket. Thus, the high value of resin having the requisite properties of cure and flow for binding fibers will be apparent.

Low flow, short cure phenolic resins also are suitable for bonding sand granules to make foundry casting molds for use in the shell metal molding industries; this latter industry is relatively new and will eventually require large quantities of phenolic resins. The cure time of the resin binder for sand granules should be 80±15 seconds at 150° C.; and the flow should be 28±10 mm. at 125° C.

Although the art has a background of almost 50 years in the manufacture of phenoplasts, nevertheless, no one, to the best of our knowledge, has succeeded in developing a commercial process to produce a phenol-formaldehyde resin having the required cure and flow properties for binding other than the conventional one-stage resin process. The difficulty with one-stage resin lies not with the product which is entirely satisfactory but with the method of producing it. One-stage resins are ordinarily produced by heating a mixture of phenol and a molal excess of formaldehyde in the presence of an alkaline catalyst at moderate temperatures, below about 95° C. Control of the condensation reaction to produce a resin of the desired properties is most difficult and despite all precautions, frequently the resultant product has undergone inadequate reaction, or worse, overpolymerization causing the resin to gel or "freeze" and become prematurely infusible. Of course, an under or over condensed resin represents a serious loss of valuable product as well as operating time.

Another conventional method for producing phenolic resins is the two-stage resin process. In the first step of preparing two-stage resins, phenol and less than a molal proportion of formaldehyde are heated in the presence of an acid catalyst to produce a fusible resin called novolak. In contrast to one-stage resin manufacture, the risk of overheating during preparation of novolak is negligible, and water and free phenol can be readily removed. The second step of the two-stage resin process involves compounding the fusible resin with hexamethylenetetramine. Unfortunately, two-stage resins do not have the requisite properties to make them suitable as binders for fibers in that the cure time is too long, generally in excess of 130 seconds, and the flow too great, usually in excess of 85 mm.

The cure time of a resin is the time in seconds required to cause hardening when a thin film of blended powdered novolak and accelerator or one-stage resin (liquid or powdered) is heated on a hot plate. The blend may vary from 2–10 parts of accelerator, e. g., hexamethylenetetramine, per 100 parts of novolak. The hot plate temperature is 150° C. The amount of thermo setting material is measured by filling a ⅜" deflagration spoon and flattening with a spatula in the case of powdered resins.

The flow of a thermo setting resin is the distance in millimeters it will flow down on an inclined plane (60° angle) at 125° C. from the time it melts to the time it is cured. For the test which applies to powdered resins only, 0.5 gram of the resin is formed into a pellet 13 mm. in diameter.

One object of the present invention is to provide an economical process for the preparation of phenol-formaldehyde resin having properties of cure and flow adapted for use as binder in manufacture of felted blankets.

Another object of this invention is to provide an economical process for the preparation of phenol-formaldehyde resin having properties of cure and flow adapted for use in binding sand granules to make foundry casting molds.

A further object of this invention is to provide an efficient method for the production of phenol-formaldehyde binder resin in which the risk of "freezing" the resin during the manufacture thereof is negligible.

Other objects and advantages of the invention will be apparent from the following description and accompanying drawing.

In accordance with the present invention the first step in the production of resin binder may be accomplished by heating a mixture of phenol and formaldehyde employing a molal excess of phenol, together with a small amount of acid catalyst, to effect condensation of the phenol-formaldehyde, and separating water from the reaction products. The resin product is a novolak.

In the second stage of the reaction the novolak in molten condition is reacted with 0.5–3% by weight hexamethylenetetramine as a water solution, preferably a 40% water solution, for about 2–7 minutes, preferably 3–5 minutes, at a temperature of 135–180° C., preferably 150–165° C. After cooling, the reaction mixture is compounded with dry hexamethylenetetramine in an amount of 2–10% by weight of the reaction mixture and, desirably when preparing resin for binding fibers, the mixture may be compounded with a small amount of lime, about 2 parts by weight of the reaction mixture. The resultant resin has a cure range of about 63±33 seconds and a flow range of about 28±10. In the production of resin for use as a binder for fibers we have found it desirable to react 1.5–3% by weight hexamethylenetetramine as a water solution with the molten novolak. In the manufacture of resin for use in binding sand granules a lesser quantity of hexamethylenetetramine in the range of 0.5–1.5% by weight may be employed. The preferred properties of the resins for binding glass or textile fibers are a cure time of 45±15 seconds at 150° C. and a flow of 23±5 mm. at 125° C. The preferred properties of the resin for use as a binder for sand granules are a cure time of 80±15 seconds at 100° C. and a flow of 28±10 mm. at 125° C. The solid resin resulting from the reaction of the novolak and aqueous hexamethylenetetramine solution is compounded with additional solid hexamethylenetetramine in an amount of 2–10% by weight of the solid resin to give the desired cure and flow properties.

The accompanying drawing is a diagrammatic flow sheet illustrating one method of practicing the present invention.

Referring to the drawing, phenol and formalin (37% $CH_2O$ in water) in about 6:5 molal ratio are introduced through lines 1 and 2, respectively, together with a small amount of sulfuric acid catalyst in an amount of about 2% by weight of the mixture entering through line 3, into a conventional mix tank 4 equipped with stirrer 5 for agitating the mixture. The reactants are withdrawn from mix tank 4 by pump 10 and directed through polymerizer 6 constructed of a series of tubular coils 7 surrounded by shell 8 enclosing a heating medium such as steam for the purpose of externally heating coil 7 and the contents therein. Condensation of the phenol formaldehyde may be effected by heating coil 7 contents to a temperature of 95–105° C. for a period of 20–30 minutes. Effluent from resinification coil 7 is discharged through line 9 into separator tank 11 wherein it separates into an upper aqueous layer and a lower resin layer. The water layer may be discharged from the system and directed through line 12 to the sewer. The resin layer withdrawn from separator tank 11 through line 13 is forced by pump 14 through steam jacketed pipe dehydrator coil 15 wherein the resin is rapidly heated to a temperature of about 150–170° C. and the vapors and liquid from dehydrator coil 15 transferred via line 16 to vapor separator 17. Water vapor, together with small amounts of reactants, phenol and formaldehyde, are released from the top of vapor separator 17 through stack 18. Dehydrated resin (novolak) in molten condition is discharged from the bottom of vapor separator 17 through line 19. This novolak has a melting point (Bar-Brush method) of about 90–100° C.

The foregoing described procedure of condensing phenol with formaldehyde is our preferred method of producing a novolak in that the operation is continuous and the resultant novolak is in molten condition thereby eliminating the necessity for solidifying and reliquefying the resin for use in the second stage processing step. Alternatively, the novolak may be produced by a batch type operation, i. e. heating in a kettle a mixture of phenol and formaldehyde in a molal ratio of about 6:5 and then applying vacuum to the reaction mixture to remove water.

The second stage treatment whether applied to a novolak produced by a continuous or batch operation imparts to the novolak heat-reactive properties as well as the required properties of cure time and flow and is critical to the operation. Referring to the drawing, a hexamethylenetetramine aqueous solution preferably a saturated solution, i. e. an aqueous solution containing about 40% by weight hexamethylenetetramine, is prepared in solution tank 21 equipped with stirrer 20. Hexamethylenetetramine solution from tank 21 is then fed at a controlled rate to provide 0.5–3% by weight hexamethylenetetramine in admixture with molten resin, by means of rotary gear pump 22, with an adjustable by-pass not shown in the drawing, through line 23 into high speed mixer designated by numeral 24. The high speed mixer 24 may be constructed of a four-foot section of four-inch standard helicoid screw 25 housed in a four-foot length of four-inch steam-jacketed pipe 26. The molten resin inlet to mixer 24 is a three-inch vertical flange nozzle 27 located on the top of the conveyer 8 inches from the head end of screw 25. The hexamethylenetetramine solution inlet nozzle is a one-inch screwed nozzle 28 located 4 inches from the downstream edge of inlet nozzle 27 and 45° below the top of the screw. The outlet from high speed mixer 24 is a three-inch vertical nozzle 29 located on the bottom of pipe 26 about 8 inches from the tail end of helicoid screw 25. The helicoid screw 25 is driven at a speed of about 1,000 R. P. M. by a 2 H. P. electric motor 31. The primary function of high speed mixer 24 is to obtain quick intimate admixture in controlled proportions of the stream of dry molten resin entering through line 19 and the hexamethylenetetramine aqueous solution entering through line 23.

The reactor designated by numeral 32 may be constructed of a twelve-foot length of twelve-inch helicoid screw 33 housed in a steam-jacketed U-shaped trough 34 open at the top. The sides of trough 34 extend 6 inches above the top of screw 33. In order to maintain more uniform temperatures in reactor 32 helicoid screw 33 may be constructed with a hollow screw shaft and the stub shafts of screw 33 fitted with rotary joints and steam (not shown in the drawing) connected through them to the inside of the hollow screw shaft. Helicoid screw is driven by a 1 H. P. variable speed drive 35 at speeds of 2 to 13 R. P. M. Additional heat is supplied by 8 infra-red heaters 36 disposed above the open end of trough 34. The resin outlet is a four-inch nozzle 37 located on the bottom end of trough 34 from the tail end of screw 33.

As is apparent, the temperature within reactor 32 can be maintained within the range of 135–180° C., preferably 150–165° C. by controlling the heat input by means of steam-jacketed trough 34 and infra-red heaters 36. We have found that when temperatures below 135° C. are employed in reactor 32 that the reaction time is unduly long and more important that the resultant resin retains some of the water added to the mixture by means of the hexamethylenetetramine solution resulting in an unsatisfactory resin product. At reaction temperatures in excess of 180° C. the resultant product was also found to be unsatisfactory apparently due to the condensation not being uniform. Our preferred temperature range is 150–165° C. Likewise, the time of reaction in reactor 32 is important in the production of the desired resin and should not be below 2 minutes or in excess of 7 minutes, preferably between 3–5 minutes. Of course, the time within the narrow range of 2–7 minutes is correlated with the temperature of the reaction within the range of 135–180° C., i. e. for a higher temperature a shorter time is employed. The residence time of the resin mixture in reactor 32 is controlled by regulating the speed of helicoid screw 25; for example with a resin rate of 1000 lbs. per hour, a residence time of 4 minutes in the reactor may be maintained by operating screw 25 at 3 R. P. M. The screw R. P. M. for any other reaction time can be calculated, because the screw moves the mixture 12 inches per revolution.

In addition to careful control of the residence time and temperature within the limits as hereinabove given, it is most important to the success of the operation to employ an aqueous solution of hexamethylenetetramine in the proportion of 0.5–3% by weight hexamethylenetetramine of the resin. We have conducted numerous experiments employing dry hexamethylenetetramine, formaldehyde and paraformaldehyde for reaction with the novolak with the result that none of the reaction products produced thereby had the requisite properties to make them suitable as a binder for fibers. We have been unable to find a satisfactory explanation or theory for the particular combination of reactants and conditions employed in the present invention producing a suitable resin binder, and other methods which on the surface appear to be equivalents not producing a suitable resin binder.

The heat reactive resin is discharged from reactor 32 through conduit 37, cooled and solidified by means of conventional flaker 38 and the solid resin discharged therefrom to storage for subsequent compounding or immediately directed through transfer line 39 to conventional grinding and mixing devices 41 for blending with dry hexamethylenetetramine and, if desired, lime. Sufficient dry hexamethylenetetramine entering through line 42 is admixed with the solid resin at substantially atmospheric temperature in an amount to make the total hexamethylenetetramine added to the resin equal to about 5–10% by weight of the resin. The addition of lime entering through line 43 to the resin mixture has also been found beneficial in an amount equal to approximately 2% of the weight of the resin. The final compounded resin is discharged through line 44 to storage.

A specific example for practicing the process and apparatus as described and illustrated in the drawing is as follows:

1,000 lbs. phenol, 720 lbs. 37% formaldehyde and 10 lbs. 50% $H_2SO_4$ are mixed in a tank. All quantities given in this example are in terms of pounds per hour. The mixture of phenol, formaldehyde and $H_2SO_4$ catalyst is then passed through a tubular coil surrounded by a steam heated jacket to raise the temperature of the reactants to 100° C. in the coil where they are retained for a period of about 20 minutes. The effluent from the resinification coil is discharged into a separator tank forming an upper water layer and a lower resin layer. The upper water layer constituting 395 lbs. is discharged from the system. The lower resin layer containing some water and consisting of 1335 lbs. is pumped through a steam jacketed pipe dehydrator coil wherein the resin is rapidly heated to a temperature of 160° C. and then discharged from the dehydrator coil at atmospheric pressure into a vapor separator also maintained at atmospheric pressure. Water and small amounts of phenol and formaldehyde in vapor form together constituting 335 lbs. are released from the top of the vapor separator. Molten dehydrated resin (novolak) in an amount of 1,000 lbs. is continuously discharged from the bottom of the vapor separator. In another mixing tank hexamethylenetetramine and water in the proportion of 12.5 lbs. of the former to 18.75 lbs. of the latter are mixed to form a 40% hexamethylenetetramine aqueous solution totalling 31.25 lbs. The 1,000 lbs. novolak and 31.25 lbs. hexamethylenetetramine are rapidly mixed together and the mixture transferred to a reactor wherein it is retained for a period of 4 minutes at a temperature of 150° C. During the last reaction the 18.75 lbs. of water added as the hexamethylenetetramine solution is vaporized and released to the atmosphere. The heat-reactive resin from the reactor is quickly cooled and solidified by passing it onto a flaker. The solid resin consisting of 1012.5 lbs. is ground and blended at atmospheric temperature with 9% dry hexamethylenetetramine and 2% lime. The final resin has a cure time of 50 seconds and a flow of 25 mm., and in all respects is eminently suitable as a resin for binding fibers.

Although certain preferred embodiments of the invention have been disclosed for purpose of illustration it will be evident that various changes and modifications may be made therein without departing from the scope and spirit of the invention.

We claim:

1. A method of preparing a heat-reactive phenol-formaldehyde resin for use in the production of binder resin which comprises condensing phenol with formaldehyde in the molal proportion of about 6 mols phenol with 5 mols formaldehyde in the presence of an acid catalyst to produce a fusible resin, separating water from the reaction products, admixing the dehydrated fusible resin in molten condition with an aqueous hexamethylenetetramine solution in an amount of 0.5–3% by weight hexamethylenetetramine based on the fusible resin, maintaining the mixture at a temperature within the range of 135–180° C. for about 2–7 minutes to produce a heat-reactive resin, and cooling and solidifying the heat-reactive resin.

2. A method of preparing a heat-reactive phenol-formaldehyde resin for use in the production of binder resin which comprises condensing phenol with formaldehyde in the molal proportion of about 6 mols phenol with 5 mols formaldehyde in the presence of an acid catalyst to produce a fusible resin, separating water from the reaction products, admixing the dehydrated fusible resin in molten condition with an aqueous hexamethylenetetramine solution in an amount of 0.5–3% hexamethylenetetramine based on the fusible resin, maintaining the mixture at a temperature within the range of 150–165° C. for 3–5 minutes to produce a heat-reactive resin, and cooling and solidifying the heat-reactive resin.

3. A process for the production of low flow, short cure phenol-formaldehyde resin binder which comprises condensing phenol with formaldehyde in the molal proportion of about 6 mols phenol with 5 mols formaldehyde in the presence of an acid catalyst to produce a fusible resin, separating water from the reaction products, admixing the dehydrated fusible resin in molten condition with an aqueous hexamethylenetetramine solution in an amount of 0.5–3% by weight hexamethylenetetramine based on the fusible resin, maintaining the mixture at a temperature within the range of 135–180° C. for about 2–7 minutes, cooling and solidifying the heat-reactive resin, and compounding the solid heat-reactive resin with 2–10% by weight of dry hexamethylenetetramine to produce a heat-reactive resin having a cure time of 63±33 seconds and a flow of 28±10.

4. A process for the production of low flow, short cure phenol formaldehyde resin adapted for use in binding fibers which comprises condensing phenol with formalin in the molal proportion of about 6 mols phenol with 5 mols formaldehyde in the pressure of an acid catalyst to produce a novolak, separating water from the reaction products, rapidly admixing the dehydrated novolak in molten condition with an aqueous solution containing about 40% hexamethylenetetramine in an amount of 1.5–3% hexamethylenetetramine by weight of the novolak, maintaining the mixture at 150–165° C. for about 3–5 minutes, vaporizing water from the mixture during the reaction of the molten novolak with the aqueous solution of hexamethylenetetramine, immediately cooling and solidifying the heat-reactive resin resulting from the reaction of the molten novolak with the aqueous solution of hexamethylenetetramine, and compounding solid heat-reactive resin at substantially atmospheric temperatures with 2–10% by weight dry hexamethylenetetramine and a small amount of lime to produce a heat-reactive resin having a cure time of 45±15 seconds at 150° C. and a flow of 23±5 mm. at 125° C.

5. A process for the production of low flow, short cure phenol formaldehyde resin adapted for use in binding sand granules which comprises condensing phenol with formalin in the molal proportion of about 6 mols phenol with 5 mols formaldehyde in the presence of an acid catalyst to produce a novolak, separating water from the reaction products, rapidly admixing the dehydrated novolak in molten condition with an aqueous solution containing about 40% hexamethylenetetramine in an amount of 0.5–1.5% hexamethylenetetramine by weight of the novolak, maintaining the mixture at 150–165° C. for about 3–5 minutes, vaporizing water from the mixture during the reaction of the molten novolak with the aqueous solution of hexamethylenetetramine, immediately cooling and solidifying the heat-reactive resin resulting from the reaction of the molten novolak with the aqueous solution of hexamethylenetetramine, and compounding solid heat-reactive resin at substantially atmospheric temperature with 2–10% by weight dry hexamethylenetetramine to produce a heat-reactive resin having a cure time of 80±15 seconds at 150° C. and a flow of 28±10 mm. at 125° C.

6. In a method for the manufacture of heat-reactive resin adapted for use in the production of resin binder, the improvement which comprises admixing molten novolak with an aqueous solution of hexamethylenetetramine in an amount of 0.5–3% by weight hexamethylenetetramine based on the molten novolak, maintaining the mixture for a period of about 2–7 minutes at a temperature of 135–180° C. and cooling and solidifying the heat-reactive resin.

References Cited in the file of this patent

UNITED STATES PATENTS

| Number | Name | Date |
|---|---|---|
| 2,124,532 | Schmitz | July 26, 1938 |
| 2,193,941 | Seebach | Mar. 19, 1940 |
| 2,606,888 | William et al. | Aug. 12, 1952 |

FOREIGN PATENTS

| Number | Country | Date |
|---|---|---|
| 606,661 | Great Britain | Aug. 18, 1948 |